United States Patent
Wallace et al.

(10) Patent No.: US 8,756,973 B2
(45) Date of Patent: Jun. 24, 2014

(54) SURFACE SENSOR OFFSET

(75) Inventors: David Sven Wallace, Nympsfield (GB); Jean-Louis Grzesiak, Bristol (GB)

(73) Assignee: Renishaw PLC, Wotton-under-Edge (GB)

( * ) Notice: Subject to any disclaimer, the term of this patent is extended or adjusted under 35 U.S.C. 154(b) by 385 days.

(21) Appl. No.: 12/452,078

(22) PCT Filed: Jul. 11, 2008

(86) PCT No.: PCT/GB2008/002375
§ 371 (c)(1), (2), (4) Date: Dec. 15, 2009

(87) PCT Pub. No.: WO2009/010721
PCT Pub. Date: Jan. 22, 2009

(65) Prior Publication Data
US 2010/0132432 A1 Jun. 3, 2010

(30) Foreign Application Priority Data
Jul. 13, 2007 (GB) .................................. 0713639.3

(51) Int. Cl.
*G01B 21/04* (2006.01)

(52) U.S. Cl.
USPC ............................................ 73/1.79; 73/1.81

(58) Field of Classification Search
USPC ......................................... 73/1.75, 1.79, 1.81
See application file for complete search history.

(56) References Cited

U.S. PATENT DOCUMENTS

| | | | |
|---|---|---|---|
| 4,888,877 A * | 12/1989 | Enderle et al. | 33/559 |
| 5,138,563 A | 8/1992 | Debitsch et al. | |
| 5,189,806 A | 3/1993 | McMurtry et al. | |
| 5,665,896 A * | 9/1997 | McMurtry | 73/1.75 |
| 6,327,788 B1 | 12/2001 | Seddon et al. | |
| 7,712,224 B2 * | 5/2010 | Hicks | 33/502 |
| 2004/0088874 A1* | 5/2004 | Sohn et al. | 33/554 |
| 2005/0000275 A1* | 1/2005 | Shuman | 73/105 |
| 2011/0000277 A1* | 1/2011 | MacManus | 73/1.79 |

FOREIGN PATENT DOCUMENTS

| | | |
|---|---|---|
| CN | 1207807 A | 2/1999 |
| EP | 0 759 534 A2 | 2/1997 |
| EP | 1 467 175 A2 | 10/2004 |

(Continued)

OTHER PUBLICATIONS

Weckenmann et al., "Beurteilung der Genauigkeit von Formprufgeraten," *Werkstattstechnik*, Springer Verlag, Berlin, Germany, vol. 78, No. 3, Mar. 1, 1988, pp. 165-170.

(Continued)

*Primary Examiner* — Hezron E Williams
*Assistant Examiner* — Nashmiya Fayyaz
(74) *Attorney, Agent, or Firm* — Oliff PLC

(57) ABSTRACT

A method of operating a coordinate positioning apparatus having a surface sensor that is rotatable about at least a first axis. The method comprises obtaining a first measurement with the surface sensor at a first angular orientation and obtaining a at least a second measurement with the surface sensor at a second angular orientation. The first and second angular orientations are different to each other such that any offset of the surface sensor from an expected position will have at least a partially opposing affect on the first and second measurements. The method then compensates and/or establishes for the offset using the first and second measurements.

23 Claims, 10 Drawing Sheets

(56) References Cited

FOREIGN PATENT DOCUMENTS

| GB | 2 108 715 A | 5/1983 |
|---|---|---|
| JP | A-2000-501505 | 2/2000 |
| JP | A-2004-317159 | 11/2004 |
| WO | WO 90/07097 A1 | 6/1990 |

OTHER PUBLICATIONS

International Search Report issued for International Application No. PCT/GB2008/002375 on Oct. 15, 2008.
Written Opinion of the International Searching Authority issued for International Application No. PCT/GB2008/002375 on Oct. 15, 2008.
European Office Action received Jul. 12, 2010 issued in European Patent Application No. 08 775 916.3.
Jun. 5, 2012 Chinese Office Action issued in Chinese Patent Application 200880024540.6 (with translation).
Mar. 22, 2013 Office Action issued in Japanese Patent Application No. 2010-516560 (with English Translation).
Mar. 1, 2013 Office Action issued in Chinese Patent Application No. 200880024540.6.
Jun. 16, 2011 Office Action issued in Chinese Patent Application No. 200880024540.6.
Nov. 27, 2012 European Search Report issued in European Patent Application No. 12 00 5001.
Translation of Chinese Office Action dated Jun. 16, 2011 issued in Chinese Patent Application No. 200880024540.6.
Chinese Patent Office, Office Action dated Sep. 2, 2013 in Chinese Patent Application No. 200880024540.6 w/Appendix.
European Patent Office Communication in European Application No. 12 005 001.8 dated Feb. 18, 2014.
Chinese Office Action dated Mar. 17, 2014 in Chinese Patent Application No. 200880024540.6 w/English-language Translation.

* cited by examiner

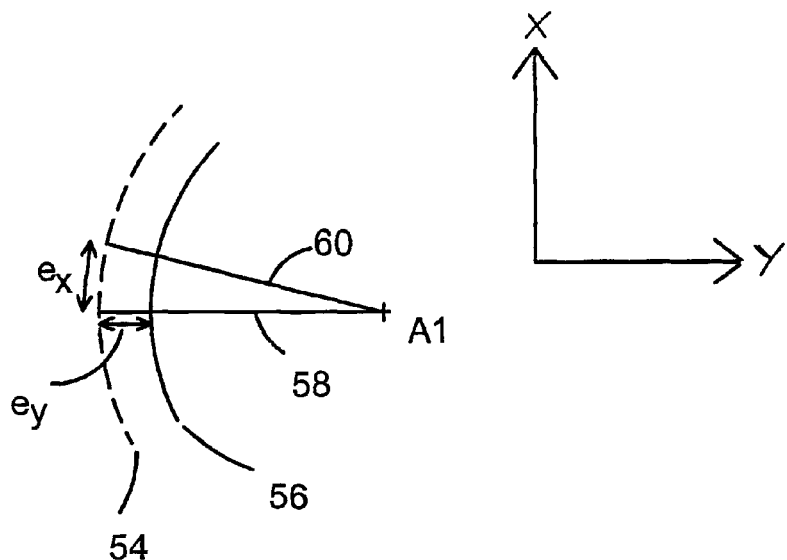
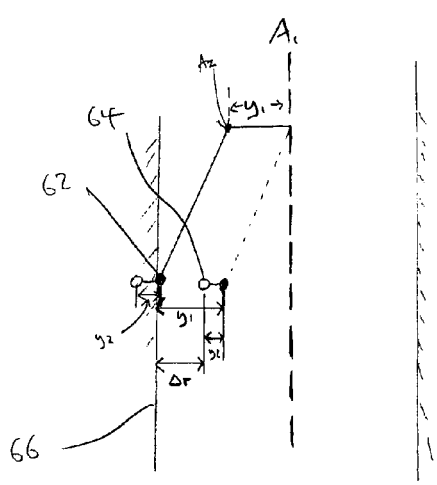
Figure 9
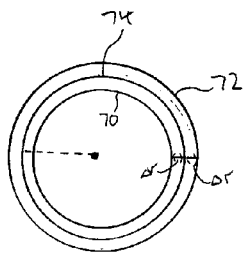
Fig 6
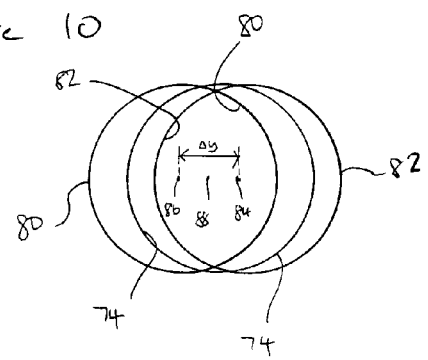
Figure 10
Figure 11

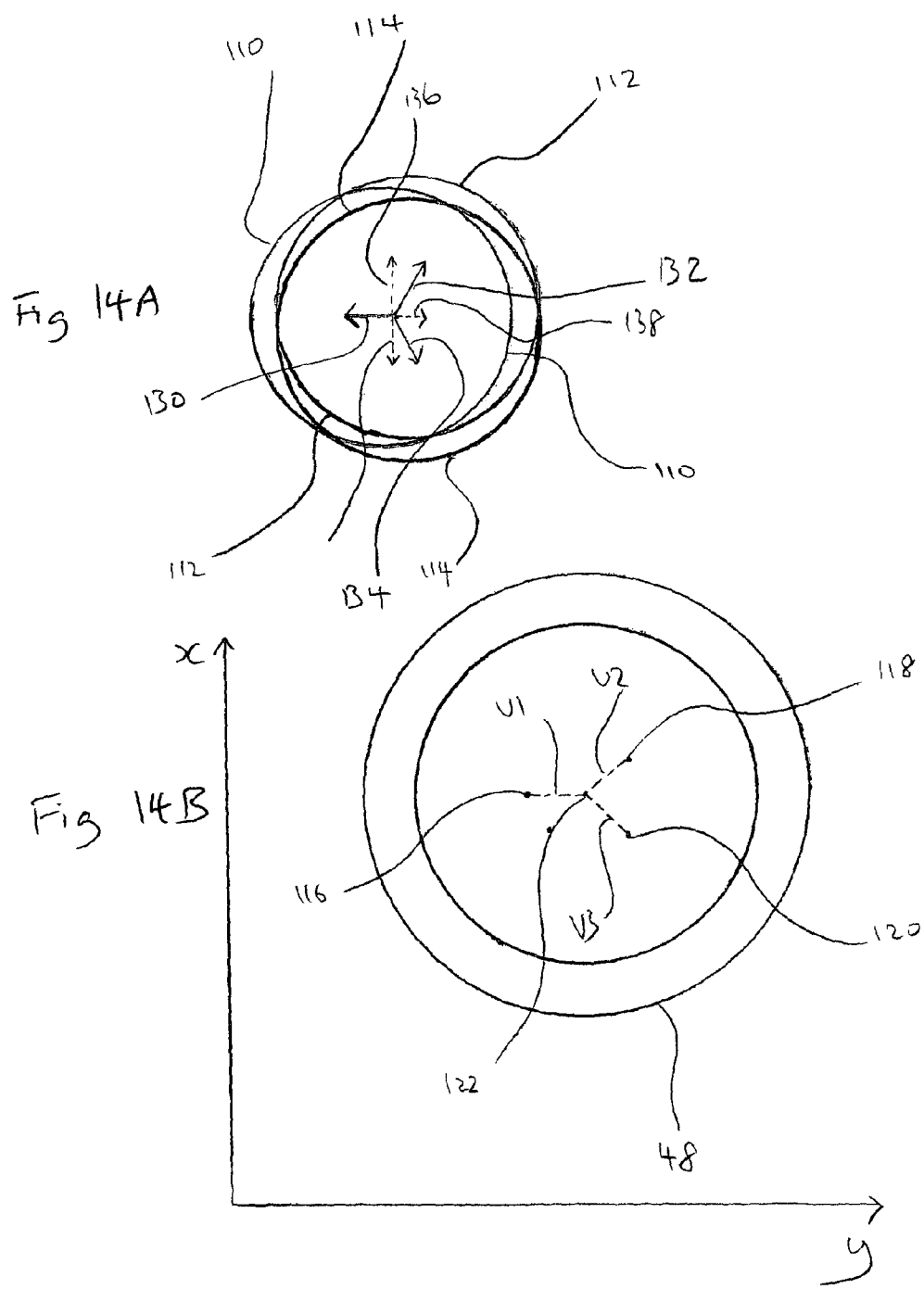

SURFACE SENSOR OFFSET

The present invention relates to techniques for compensating for and/or establishing the offset of a surface sensor, in particular a sensor for an articulating probe head and can for instance be used to determine and/or correct geometric errors of the surface sensing tip of a probe mounted on an articulating probe head.

It is common practice after workpieces have been produced to inspect them on a positioning apparatus such as a coordinate measuring machine (CMM) or other type of coordinate positioning apparatus. Such coordinate positioning apparatus typically have a quill onto which a measurement probe is mounted which can be driven in three orthogonal directions X, Y, Z within a working volume of the machine.

U.S. Pat. No. 5,189,806 describes an articulating probe head capable of orientating a probe with two rotational degrees of freedom to enable the probe to be used in an operation for scanning the surface of workpieces. In general such a probe head includes two rotary drive mechanisms which enable a probe to be orientated about two substantially orthogonal rotary axes. Such an articulating probe head may be mounted on the quill of a CMM to enable the probe tip to be positioned in 5 degrees of freedom (i.e. 3 linear degrees of freedom provided by the CMM and 2 rotary degrees of freedom provided by the articulating probe head).

A measurement probe has a surface sensor part which interacts with the surface of the workpiece in order to collect measurement data. It is possible for there to be a difference between the actual and assumed position of the surface sensor part relative to a part of the probe system, such as the probe body or probe head. Such a difference can be a source of inaccuracies in the measurement data obtained. Such a difference can have a significant impact on the accuracy of measurement data obtained using a measurement probe on articulating head as the effect of the difference on the measurement data can be dependent on the angular position of the measurement probe.

The present invention provides a method for measuring an object using a measurement system having surface sensor that is rotatable about at least one axis, which comprises performing a first measurement with the surface sensor at a first angular orientation and performing a second measurement with the surface sensor at a second angular orientation, the second angular orientation being such that the effect of any offset of the surface sensor from an expected position on the second measurement is different to the first measurement.

According to a first aspect of the invention there is provided a method of operating a coordinate positioning apparatus having a surface sensor that is rotatable about at least a first axis, the method comprising: obtaining a first measurement with the surface sensor at a first angular orientation about the at least first axis; obtaining at least a second measurement with the surface sensor at a second angular orientation about the at least first axis, the first and second angular orientations being different to each other such that any offset of the surface sensor from an expected position will have at least a partially opposing effect on the first and second measurements. The method can comprise compensating for the offset using the first and second measurements. The method can comprise establishing the offset using the first and second measurements. The method can comprise both establishing and compensating for the offset using the first and second measurements.

The invention provides a new way of identifying and/or coping with errors introduced into measurement data obtained by a surface sensor which is offset from an expected position. Once the error and/or offset is known it is possible to take action to compensate for the error and/or offset. For instance the coordinate positioning apparatus could be calibrated on the basis of the error. Optionally the method may further comprise the step of correcting the error. For instance the first and/or second measurement could be corrected, or subsequent measurement(s) could be corrected based on the determined error. Optionally, the method of the invention might be used to establish any offset. Once established, appropriate subsequent action can be taken. For instance, the surface sensor could be replaced.

Configuring the second angular orientation such that any offset of the surface sensor from an expected position will have an effect on the second measurement that is at least partially opposing to the affect it has on the first measurement makes it possible to determine any error by comparing the first and second measurements. Accordingly, compensating for the offset can comprise comparing the first and second measurements. Furthermore, compensating for the offset can comprise determining the difference between the first and second measurements.

As will be understood the effect of an offset of the surface sensor on the measurement of an artefact can depend on factors including the method by which the artefact is measured. For instance with regard to measuring the inner circumference of a bore, if a bore is measured by rotating the surface sensor about the bore's centre axis, then an offset can cause the bore to be measured as being a different size to its actual size. Accordingly, in this case for example, if the effect of the offset on the first measurement is that it makes the feature appear bigger than its actual size then the effect of the offset on the second measurement should be such that it makes the feature appear smaller than its actual size.

However, if the angular orientation of the surface sensor relative to the bore is kept constant and the surface sensor is translationally moved around the bore then the measured size of the bore will be correct but its measured position in the measurement volume will be offset by an amount relative to the offset of the surface sensor. As will be understood, translationally moving the surface sensor can comprise moving the surface sensor along the linear axes of the coordinate positioning apparatus. Accordingly, in this case for example, if the effect of the offset on the first measurement is that it measures the translational position of the feature to be offset in a first direction, then the effect of the offset on the second measurement should be such that its translational position is offset in a second direction. The second direction should be such that it can be resolved into two orthogonal components one of which is directly opposite the first direction. Accordingly, the affect does not need to be equal and opposite, or in other words directly opposite. The effect of the offset on the at least second measurement can merely have a component which is directly opposite its effect on the first measurement.

It will therefore be understood that how the at least second angular position is selected such that the effect of the offset on the at least second measurement is opposite to its effect on the first measurement will depend on the method by which first and at least second measurements are performed.

Preferably, the at least second angular orientation is different to the first angular orientation such that the effect on the second measurement of any offset of the surface sensor from an expected position is substantially equal and opposite to its effect on the first measurement. This can be achieved by configuring the second angular position such that it is substantially the inverse of the first angular position. In other words, the second angular position can be substantially equal and opposite to the first angular position. In one embodiment this can be when the surface sensor at the second angular orientation is rotated by substantially 180° about the at least first axis. In another embodiment, this is when the surface sensor is rotated by an equal amount, but in an opposite direction about the first axis relative to a line extending perpendicular to the first axis. As will be understood, this can be when the surface sensor is in a substantially geometrically opposite position, for example, substantially geometrically opposite relative to an axis that extends perpendicular to measurement dimension of the surface sensor. In embodiments in which the surface sensor can obtain measurements in two dimensions, then this can be when the surface sensor is substantially geometrically opposite relative to an axis that extends perpendicular to measurement plane of the surface sensor. As will be understood, how the angular position of the surface sensor is manipulated in order for the second angular position to be the inverse of the first angular position can depend on the orientation of the first axis about which the surface sensor is positioned.

As will be understood, obtaining first and second measurements can mean obtaining first and second measurement data. The measurement data can comprise one or more position data. The position data can be representative of the position of a point on an artefact. For instance, the position data can be representative of the position of a point on an artefact in the measurement volume of the coordinate positioning apparatus.

The first and second measurements need not be measurements of the same artefact. For instance, the first measurement can be of a first artefact and the second measurement can be of a second artefact that is different to the first artefact. In this case it can be preferred that the first and second artefacts are of known dimensions and positional relationship in the coordinate positioning apparatus' measurement volume.

It can be preferred that the first and second measurements are measurements of the same first artefact. In this case it is not necessary for the first and second measurements to be measurements of the same parts of the first artefact. For instance, if the artefact is a cube, such as a calibrated cube, then the first measurement could be of a first face of the cube and the second measurement could be of a second face of the cube. The second face could be the face that directly opposes the first face.

Nevertheless, it can be preferred that obtaining the first measurement comprises obtaining position data of at least a first point on an artefact and that obtaining the at least second measurement comprises obtaining position data of at least the first point on the artefact. Accordingly, it can be preferred that the first and second measurements each comprise position data on at least one common point on an artefact. This can avoid the need to use a calibrated artefact.

Obtaining the first measurement can comprise measuring the position of only one point on an artefact. Obtaining the at least second measurement can comprise measuring the position of only one point on an artefact. In line with the discussion above, the point could be the same point or a different point.

Preferably, obtaining the first measurement comprises measuring the position of a plurality of points on an artefact. Preferably, obtaining the at least second measurement comprises measuring the position of a plurality of points of an artefact. In line with the discussion above, the method can be configured such that the at least second measurement comprises measuring at least one point on the artefact that was measured during the first measurement. The method can be configured such that the at least second measurement comprises measuring substantially the same points on the artefact that were measured during the first measurement. The plurality of points could be obtained by taking a plurality of discrete measurements. Optionally the plurality of points could be obtained by scanning an artefact. Accordingly, the surface sensor could be a two-state device, such as a touch-trigger probe. Optionally, the surface sensor could be an analogue scanning device, such as an analogue scanning probe, for example an optical scanning probe.

The first and at least second measurements can be measurements of a single point. For instance, the first and at least second measurements can be measurements of a point on a plane. The first and at least second measurements can be measurements of a corner of an object. For instance, the first and at least second measurements can be measurements of a corner of a cuboidal artefact. The first and at least second measurements can be measurements of a regular or a non-regular shape. For instance, the first and at least second measurements can be measurements of a square, cube, hexagonal, octagonal or freeform surface. The first and at least second measurements can comprise obtaining first and at least second measurements of a curved feature. The first and at least second measurements can comprise obtaining first and at least second measurements of an elliptical feature. The first and at least second measurements can comprise obtaining first and at least second measurements of a circular feature. The circular feature could be part circular. The circular feature could be a complete circle. Accordingly the first and at least second measurements can comprise obtaining first and at least second measurements of the complete circle. The circular feature could comprise a ring gauge, a bore in a body or a sphere.

Compensating for the offset can comprise determining the offset. The offset can comprise a distance. For example a distance from a reference position. The reference position can be an expected position. The offset can comprise an angular offset.

Compensating for the offset can comprise determining the offset in at least a first dimension. Compensating for the offset can comprise determining the offset in the first dimension only. Compensating for the offset can comprise determining the offset in at least a second dimension.

The at least first dimension can be perpendicular to the at least first axis about which the first and second angular orientations are taken. The second dimension can be perpendicular to the first dimension. The second dimension can be perpendicular to the axis about which the first and second angular orientations are taken.

As will be understood the surface sensor can enable position information to be obtained about a surface of an artefact. The surface sensor could be configured to obtain position information in at least a first measurement dimension, for instance in a first measurement dimension and at least a second measurement dimension. Preferably the first and/or at least second measurement dimensions are linear dimensions. Preferably the first and second measurement dimensions are perpendicular to each other. As will be understood the first and if present at least second measurement dimensions can be fixed relative to the surface sensor. Accordingly the measurement dimensions can move with the surface sensor. In particular the measurement dimensions can rotate with the surface sensor.

The actual position of the surface sensor can be offset from an expected position in the first measurement dimension. The actual position of the surface sensor can be offset from an expected position in the second measurement dimension. The actual position of the surface sensor can be offset from an expected position in the first and second measurement dimensions.

The method can comprise determining the offset of the surface sensor in the first measurement dimension. In particular, compensating for the offset can comprise determining the offset of the surface sensor in the first measurement dimension only.

The first and second measurements can be obtained by moving the surface sensor such that the surface sensor measures in a first dimension only relative to itself. The first dimension can, for instance, be perpendicular to the first axis. The first dimension can be the first or second measurement direction. In either case, the first and at least second measurements will only be affected by an offset in the first dimension. Therefore an offset of the surface sensor in a second dimension will not have an effect on the first and second measurements. That is the first and at least second measurements can be blind to any offset of the surface sensor in dimensions other than the first dimension. This can be achieved, for instance, by moving the surface sensor during the first and second measurements such that its orientation relative to the surface of the artefact being measured is always substantially the same. In other words, the surface sensor is moved such that substantially the same point of the surface sensor interacts with the surface in order to obtain measurement data. For instance, with a contact probe having a contact tip, the contact tip is moved so that substantially the same point of the contact tip contacts the surface being measured. For example, for a circular feature this can be achieved by rotating the surface sensor about the circle's central axis.

The method can comprise determining the offset of the surface sensor in a second dimension. This can be in addition to determining the offset of the surface sensor in the first dimension.

Obtaining the first and at least second measurements can comprise moving the surface sensor relative to the artefact such that the surface sensor measures in first and second dimensions relative to itself. Accordingly, in this case, the first and at least second measurements are affected by any offset in the first dimension and any offset in the second dimension. This can be achieved, for instance, by moving the surface sensor during the first and at least second measurements such that its orientation relative to the surface of the artefact being measured is varied. In other words, the surface sensor can be moved such that different points of the surface sensor interacts with the surface in order to obtain measurement data. For instance, with a contact probe having a contact tip, the contact tip can be moved so that different points of the contact tip contacts the surface being measured. For example, for a circular feature this can be achieved by keeping the rotational orientation of the surface sensor fixed and translationally moving the surface sensor around the circle.

Compensating for the offset can comprise determining a resultant measurement of the artefact from the first and at least second measurements. The resultant measurement of the artefact can be a corrected measurement of the artefact being measured. As will be understood, the corrected measurement will be a measurement which would have been obtained using the surface sensor had there been no surface sensor offset. Accordingly, a corrected measurement can represent the actual or true dimensions and position of the part of the artefact being measured relative to the coordinate positioning system's measurement volume. The resultant measurement can be determined directly from the first and at least second measurements. For instance the resultant measurement can be determined by comparing the first and second measurements.

In particular the resultant measurement can be determined by determining the difference between the first and at least second measurements. The resultant measurement could be determined by determining the average of the first and at least second measurements. The resultant measurement can be determined instead of determining the offset of the surface sensor in at least the first dimension. The resultant measurement can be determined as well as determining the offset of the surface sensor in at least the first dimension. The resultant measurement can be determined from the determined offset of the surface sensor in at least the first dimension and at least one of the first and at least second measurements.

The at least second measurement can be a repeat of the first measurement. As will be understood, this can mean that substantially the same points are measured. This can also mean that substantially the same motion of the coordinate positioning machine is used to obtain the measurement. However, as will be understood the second angular orientation will be different to the first. Using a repeat measurement can avoid the need to use a calibrated artefact. This is because the offset can be established and/or compensated for by directly comparing the first and second measurements. The first and second measurements can be measurements of the same points on an artefact. The first and second measurements do not have to be performed in the same order. In other words the order in which the points in a measurement are obtained does not have to be the same for the first and at least second measurements. For instance, the first and second measurements can have a different start and/or end point. For example, the first measurement can be obtained by relative movement of the surface sensor and artefact in a first direction and the second measurement can be obtained by relative movement in a second direction. The second direction can be opposite to the first direction.

The surface sensor can be rotatable about at least a second axis. This provides a greater range of movement of the surface sensor. Preferably the second axis is perpendicular to the first axis. In embodiments in which the surface sensor is rotatable about first and second axes, preferably the angular position of the surface sensor is taken about the first axis. In this case the first and second angular orientations can be taken about the first axis and measured relative to the second axis. In embodiments in which the first and second axes do not intersect then the first and second angular orientation can be taken about the first axis and measured relative to a line extending parallel to the second axis and through the first axis. The second angular orientation can be opposite the first angular orientation relative to the second axis.

There can be more than one source of the offset. Accordingly, the method can comprise determining at least first and second offset sources. The first offset source can comprise the difference between the actual and expected position of the at least first axis. In particular, the first offset source can comprise the difference between the actual and expected position of the first axis relative to the second axis. The second offset source can comprise the difference between the actual and expected position of the surface sensor relative to the first axis.

The method can further comprise obtaining a third measurement with the surface sensor at a first angular orientation about the second axis relative to the first, and obtaining an at least fourth measurement with the surface sensor at a second angular orientation about the second axis relative to the first, in which the second angular orientation is different to the first such that any offset of the surface sensor from an expected position will have an at least partially opposing effect on the third and fourth measurements. In embodiments in which the first and second axes do not intersect then the first and second angular orientation can be taken about the second axis and measured relative to a line extending parallel to the first axis and through the second axis. Preferably the method further comprises using the third and at least fourth measurements to compensate for and/or establish the offset. Preferably the method further comprises using the first, second, third and at least fourth measurements to identify first and second sources of the offset.

The surface sensor's angular position about at least the first axis can be fixed during obtaining the first and second measurements. In this case, obtaining the first and second measurements can comprise rotating the surface sensor about the second axis. In this case, preferably the offset is in a dimension substantially perpendicular to the first and second axes. In this case, preferably the second angular orientation is equal to the first angular orientation but taken in the opposite direction relative to the second axis. Preferably, the first and second angular orientations are not more than 10°, especially preferably not more than 5° relative to the second axis.

Optionally, obtaining the first and second measurements comprises maintaining the linear position of the second axis. In this case, and as described above the surface sensor can be rotated about the second axis.

Optionally, obtaining the first and second measurements can comprise moving the linear position of the first axis and if present the second axis and maintaining the rotational position of the surface sensor about the first axis and if present second axis. Accordingly, in this case preferably the angular position of the surface sensor about the second axis (if present) does not change during or between obtaining the first and second measurements. In this case, preferably the offset is in a plane that extends substantially perpendicular to the first axis. The offset can be determined in first and second dimensions within the plane. The two dimensions can be perpendicular to each other. In this embodiment of the invention, preferably the smallest angle taken between the surface sensor's first and second angular orientations about the first axis is more than 90°, for instance at least 120°, for example 180°. In embodiments in which the angle is not substantially 180° it can be preferred to obtain more than two measurements.

For example, three or more measurements could be obtained. It can be preferred that the plurality of measurements are spaced equi-angularly around the first axis. For instance, three measurements can be obtained with the surface sensor rotated by 120° about the first axis between each measurement. As will be understood the plurality of measurements do not necessary have to be spaced equi-angularly around the first axis. However, preferably the angular orientations of the surface sensor are selected such that the offset can be compensated for in two perpendicular orientations contained in a plane that extends substantially perpendicular to the first axis.

The coordinate positioning apparatus can comprise a head which provides, and facilitates movement of the surface sensor about, the at least first axis. The head could be an active head. For instance the head could be controllable so as to drive the surface sensor about the at least first axis. The offset could be an offset of the surface sensor from an expected position relative to the head.

The coordinate positioning apparatus can comprise a coordinate positioning frame. The coordinate positioning frame can provide for movement of the surface sensor in at least one linear dimension, for example two linear dimensions, for instance three linear dimensions. Preferably the linear dimensions are perpendicular. The coordinate positioning frame can provide for movement of the surface sensor in at least one rotational degree of freedom.

As will be understood, the surface sensor could be carried by a part of the coordinate positioning frame that provides for movement of the surface sensor. The movement could be translational movement. The offset could be an offset of the surface sensor from an expected position relative to a part of the coordinate positioning frame that carries the surface sensor. For instance, the surface sensor could be carried by a quill of a coordinate positioning frame. The quill could provide for translational movement of the surface sensor. Accordingly, the offset could be the offset of the surface sensor from an expected position relative to the quill. Optionally the surface sensor could be mounted on the quill via a head, for instance a probe head, in particular an articulating probe head. Accordingly, the offset could be an offset of the surface sensor from an expected position relative to the head. The head could provide, and facilitate movement of the surface sensor about, the at least first axis.

The surface sensor could be part of a measurement probe. The measurement probe could comprise the at least first axis. The measurement probe could comprise the at least second axis. Optionally as described above the measurement probe could be mounted on a probe head which comprises the at least first axis. Accordingly the probe head can be an articulating probe head. The articulating probe head could comprise the at least second axis.

The measurement probe can comprise a probe body and the surface sensor. The probe body can be mounted on the coordinate positioning frame. Accordingly, the offset could be an offset of the surface sensor from an expected position relative to the probe body. The measurement probe can be mounted to the probe head which is in turn mounted on the coordinate positioning frame. The surface sensor can be spaced apart from the probe body. For instance the measurement probe can further comprise a stylus extending from the probe body. The surface sensor can be mounted toward the end of the stylus that is distal to the probe body.

The direction of the offset can be substantially invariant relative to the measurement probe. The extent of the offset can be substantially invariant relative to the measurement probe. For example, the offset could be one which does not vary substantially with the position of the surface sensor, for instance the angular position of the surface sensor about the at least first axis.

The surface sensor can be a surface contacting tip of a contact measurement probe. The surface sensor could be a surface interacting tip of a non-contact measurement probe, for instance an optical, inductance or capacitive measurement probe.

A second aspect of the invention provides a method of operating a coordinate positioning apparatus having a surface sensor that is rotatable about at least first and second perpendicular axes, the method comprising: positioning the surface sensor at a first angle about the first axis relative to the second axis and obtaining a first measurement; positioning the surface sensor at a second angle about the first axis relative to the second axis and obtaining a second measurement, the second angle being opposite in direction to the first angle relative to the first axis such that any offset of the surface sensor from an expected position will have at least a partially opposing effect on the first and second measurements; and using the first and second measurements to compensate for or establish the offset. Obtaining the first and second measurements can comprise rotating the surface sensor about the second axis. The second angle can be substantially equal and opposite to the first angle.

According to a third aspect of the invention there is provided a method of operating a coordinate positioning apparatus having a surface sensor which is rotatable about at least a first axis, the method comprising: positioning the surface sensor at a first angular orientation and obtaining a first measurement by translationally moving the surface sensor; positioning the surface sensor at least at a second angular orientation and obtaining at least a second measurement by translationally moving the surface sensor, the second angular orientation being different to the first angular orientation such that any offset of the surface sensor from an expected position will have at least a partially opposing effect on the first and at least second measurements; and using the first and at least second measurements to compensate for or establish the offset. Preferably the angular orientation of the surface sensor is fixed during obtaining the first and at least second methods. Preferably positioning the surface sensor at a second angular orientation comprises rotating the surface sensor about the at least first axis by at least 90°. Preferably positioning the surface sensor at a second angular orientation comprises rotating the surface sensor such that the smallest angle between the first and second angular orientations about the first axis is not less than 90°.

According to a fourth aspect of the invention there is provided a method of operating a coordinate positioning apparatus having a surface sensor which is rotatable about at least a first axis that extends substantially perpendicular to a plane of measurement of the surface sensor, the method comprising: obtaining a first measurement with the surface sensor at a first angular orientation such that any surface sensor offset in the measurement plane extends in a first direction; obtaining at least a second measurement with the surface sensor at a second angular orientation which is different to the first angular orientation such that any surface sensor offset in the measurement plane extends in a second direction that is different to the first direction. Preferably the second direction can be resolved into two orthogonal components of which one is directly opposite the first direction. Preferably the second direction is directly opposite the first direction. The method can comprise using the first and second measurements to compensate. The method can comprise using the first and second measurements to establish the offset.

According to a fifth aspect of the invention there is provided a coordinate positioning apparatus having a surface sensor that is rotatable about at least a first axis and a controller which is configured to perform the above described method.

According to a sixth aspect of the invention there is provided a computer program code comprising instructions which when executed by a controller of a measurement system having a surface sensor that is rotatable about at least a first axis causes the measurement system to perform the above described method.

According to a seventh aspect of the invention there is provided a computer readable medium, bearing the above described computer program code.

A further aspect of the present invention provides a method of error correction for a measurement system in which a surface sensor is rotatable about at least two axes, the method comprising: positioning the surface sensor at a first angular offset and measuring a circular feature to provide a first measurement; positioning the surface sensor at a second angular offset, equal and opposite the first angular offset and measuring said circular feature to provide a second measurement; and determining the difference between the first and second measurements to thereby determine the measurement error.

The method may include the step of correcting the measurement error. In first embodiment, the step of measuring a circular feature comprises rotating the surface sensor about a first axis, whilst maintaining its first or second angular offset about a second axis. In a second embodiment, the step of measuring a circular feature comprises moving the surface sensor linearly, whilst maintaining its angular offset. The surface sensor may comprise a probe tip or other sensor of a measurement probe. The measurement system may comprise a measurement probe mounted on a coordinate positioning apparatus which provides rotation of the measurement probe about at least two axes. The coordinate positioning apparatus may comprise an articulating probe head, providing rotational motion in at least two axes and a coordinate positioning apparatus, such as a coordinate measuring machine (CMM), machine tool etc providing linear motion. The circular feature may comprise, for example, a ring gauge, a bore or a sphere.

A yet further aspect of the present invention apparatus for error correction comprising a measurement system in which a surface sensor is rotatable about at least two axes and a controller for carrying out the steps of: positioning the surface sensor at a first angular offset and measuring a circular feature to provide a first measurement; positioning the surface sensor at a second angular offset, equal and opposite the first angular offset and measuring said circular feature to provide a second measurement; and determining the difference between the first and second measurements to thereby determine the measurement error.

Preferred embodiments of the present invention will be illustrated by way of example with reference to the accompanying drawings, where:

FIG. 6 illustrates the measurement profile of a section of a ring gauge;

FIG. 9 is a schematic illustration of the potential sources of measurement error;

FIG. 10 is plan view of the ring gauge showing the measurements obtained using the method described in connection with FIGS. 5A and 5B;

FIG. 11 is a plan view of the ring gauge showing the measurements obtained using the method described in connection with FIGS. 7A and 7B;

FIGS. 14A and 14B illustrate the effect of an offset on three measurements, in which the probe is rotated between each measurement such that the effect of the offset on each measurement is not directly opposite but is partially opposing.

It is known from International Patent Application No. WO90/07097 to mount a motorised articulating probe head on a coordinate measuring machine. The articulating probe head enables a probe or stylus mounted on the articulating probe head to be rotated about two orthogonal axes. Thus a probe or stylus mounted on the articulating probe head may be positioned angularly about these two axes whilst the articulating probe head can be positioned by the coordinate positioning machine in any position within the working volume of the machine.

Such an articulating probe head provides a coordinate positioning machine with greater scanning flexibility because the articulating probe head can position the probe or stylus in many different orientations.

Figure 1:
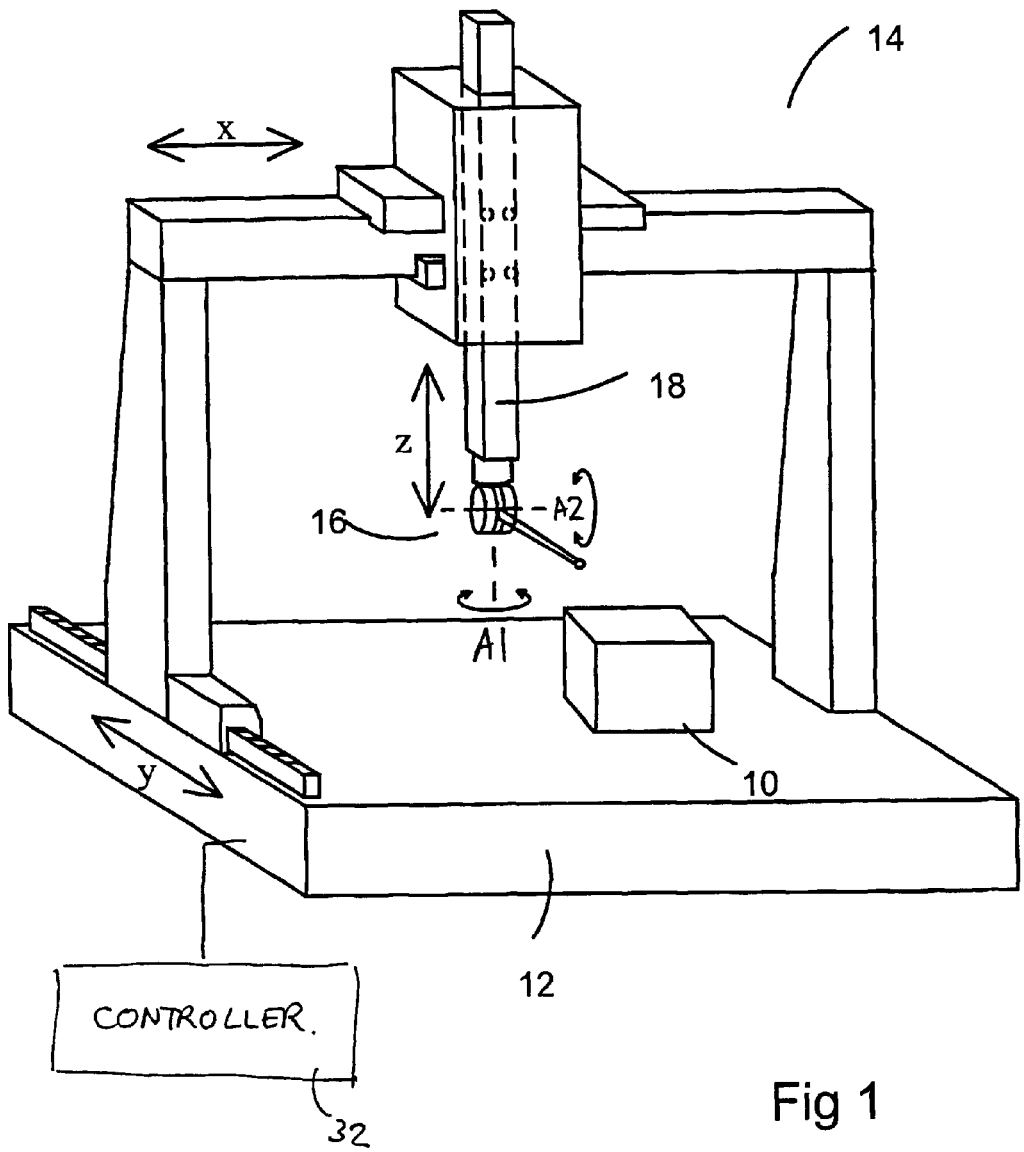
FIG. 1 illustrates a coordinate measuring machine (CMM) on which a workpiece is mounted.

FIG. 1 illustrates an articulating probe head mounted on a coordinate positioning apparatus, in this case a coordinate measuring machine (CMM). A workpiece 10 to be measured is mounted on a table 12 of the CMM 14 and an articulating probe head 16 is mounted on a quill 18 of the CMM 14. The quill is driveable in three directions X, Y, Z relative to the table by motors in a known manner. The CMM is provided by motors and transducers to provide and measure motion in each axis.

Figure 2:
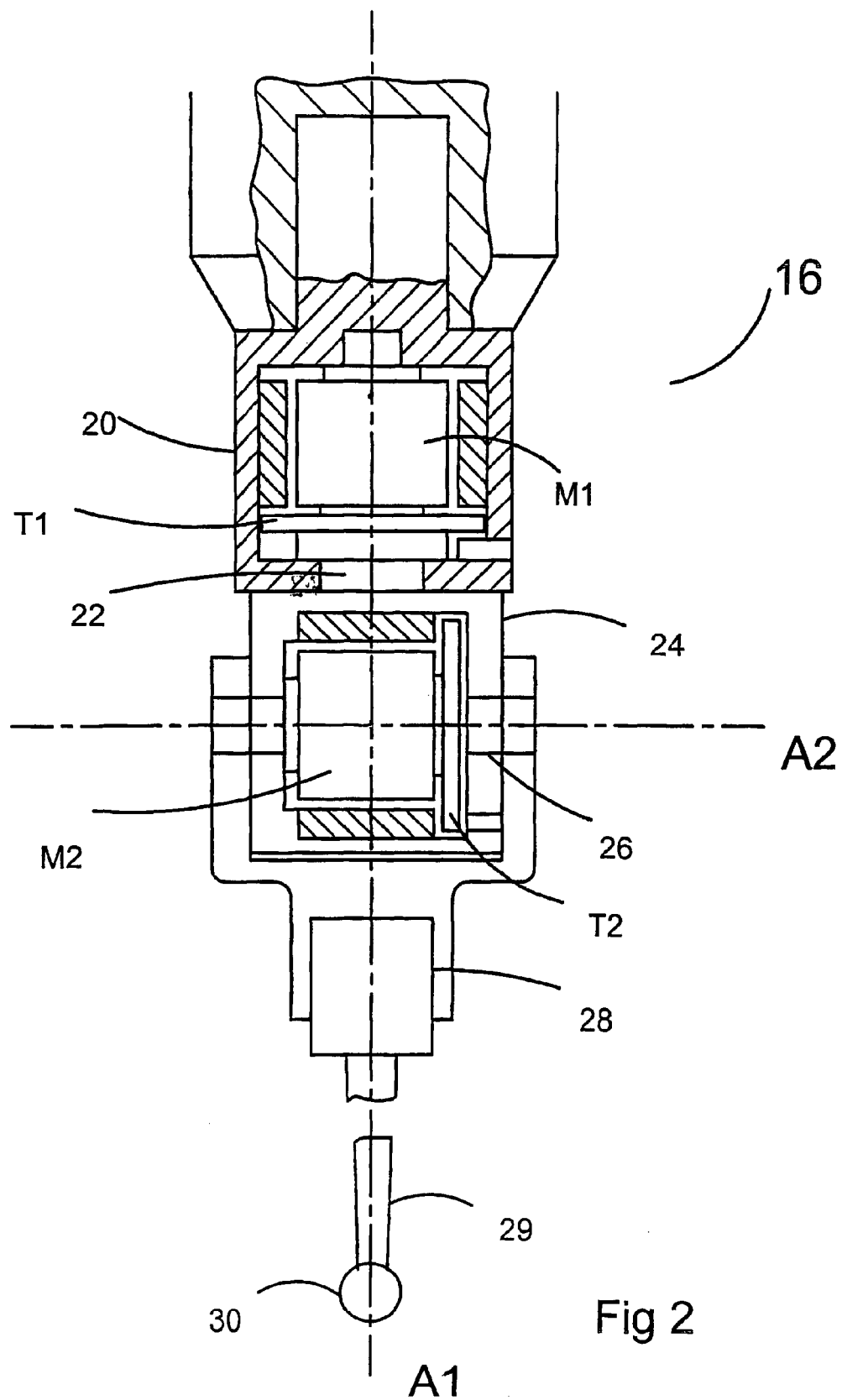
FIG. 2 illustrates an articulated scanning head for mounting on the CMM of FIG. 1.

As illustrated in FIG. 2, the articulating probe head 16 comprises a fixed part formed by a base or housing 20 supporting a movable part in the form of a shaft 22 rotatable by a motor M1 relative to the housing 20 about an axis A1. The shaft 22 is secured to a further housing 24 which in turn supports a shaft 26 rotatable by a motor M2 relative to the housing 24 about an axis A2 perpendicular to the axis A1.

A probe 28 with a stylus 29 having a workpiece contacting tip 30 is mounted onto the articulating probe head. The arrangement is such that the motors M1,M2 of the articulating probe head can position the workpiece-contacting tip angularly about the axes A1 or A2 and the motors of the CMM can position the articulating probe head linearly anywhere within the three-dimensional coordinate framework of the CMM to bring the stylus tip into a predetermined relationship with the surface being scanned.

Linear position transducers (not shown) are provided on the CMM for measuring linear displacement of the articulating probe head and angular position transducers T1 and T2 are provided in the articulating probe head for measuring angular displacement of the stylus about the respective axes A1 and A2.

A controller 32 sends drive signals to the motors of the CMM and articulating probe head to control their motion and receives inputs from the transducers of the CMM, articulating probe head and probe.

The probe may be a contact probe having a deflectable stylus. In a touch trigger probe, deflection of the stylus causes an output which latches the position of the coordinate positioning apparatus at which the trigger occurred. For a scanning probe, transducers in the probe measure the amount of stylus deflection.

On a vertical arm CMM as shown in FIG. 1, the A1 axis of the articulating probe head 16 is nominally parallel to the CMM Z axis (which is along the spindle 18). The articulating probe head may rotate the probe continuously about this axis. The A2 axis of the articulating probe head is orthogonal to its A1 axis.

The apparatus illustrated in FIGS. 1 and 2 has several errors which can be identified and compensated for. The position of the A1 axis of the articulating probe head relative to the coordinate positioning apparatus, for example a CMM, has four independent parameters, relating to the position of the A1 axis relative to the of the X, Y and Z axes of the CMM and alignment with the Z axis. The articulating probe head has two parameters, relating to the relative angle between the A1 and A2 axes (which ideally should be orthogonal) and to the shortest distance between them (which ideally should intersect). At the probe tip, there are three parameters relating the position of the stylus tip to the probe head (for example distance between the A2 axis and probe tip, offset along the A2 axis and offset perpendicular to the A2 axis). There is likely to be a geometric error relating to the offset of the stylus tip from its expected position. Any offset in the dimension perpendicular to the A2 axis can have a significant impact on the measurement accuracy of the probe.

Figure 3:
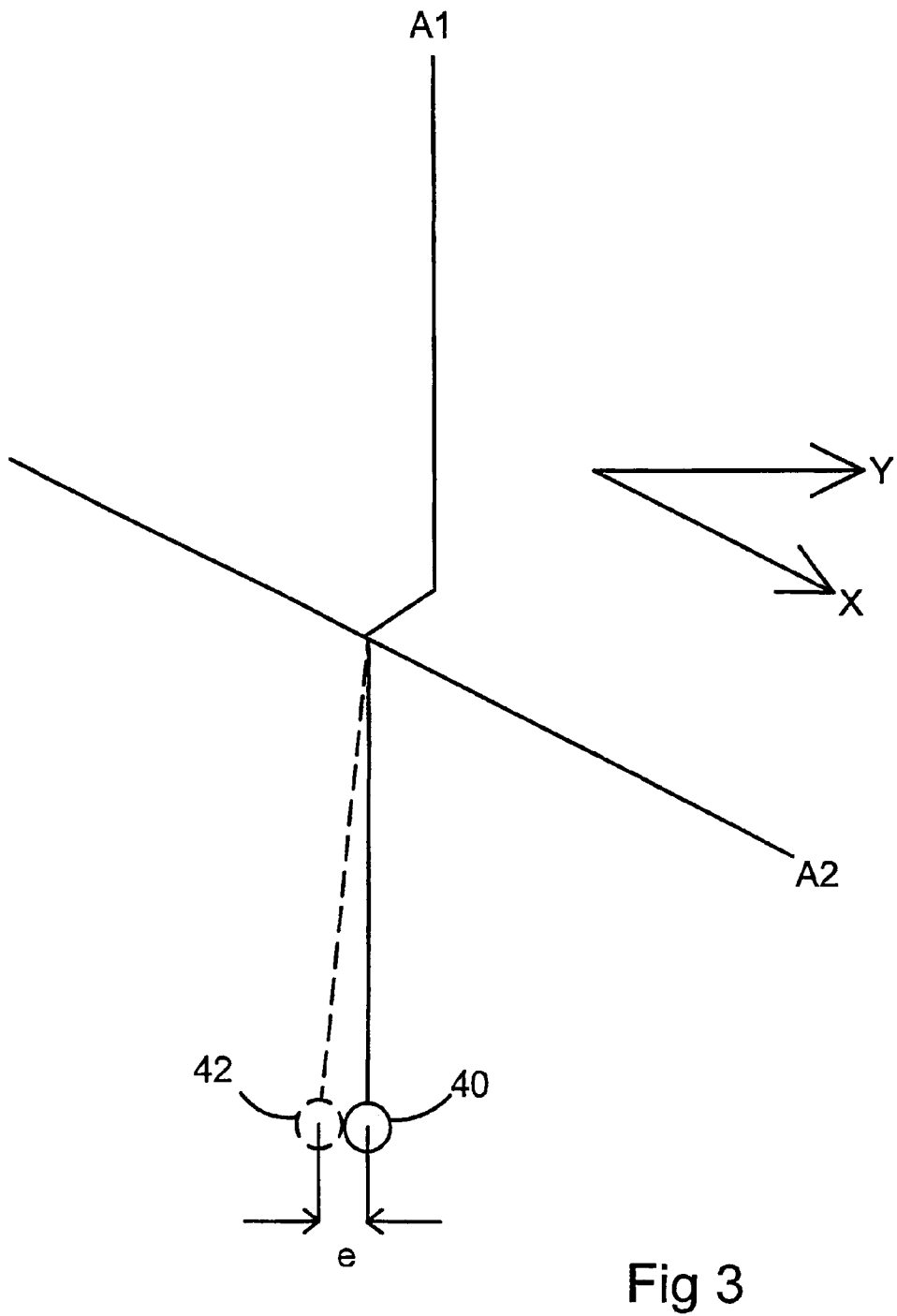
FIG. 3 illustrates the position of the axes of the articulating probe head and the stylus tip.

FIG. 3 illustrates the two axes A1, A2 of the articulating head, the expected position of the stylus tip 40 and the actual position of the stylus tip 42. The difference between these two positions is the offset error e. This offset error is caused by the geometry of the probe.

This offset error can be seen when helical scanning vertically orientated bores (i.e. by rotation of the articulating scanning head principally about the A1 axis) circular features, such as bores, in the form of a radial error. The offset causes a position error in the measurement of other features (e.g. non vertical bores).

Figure 4:
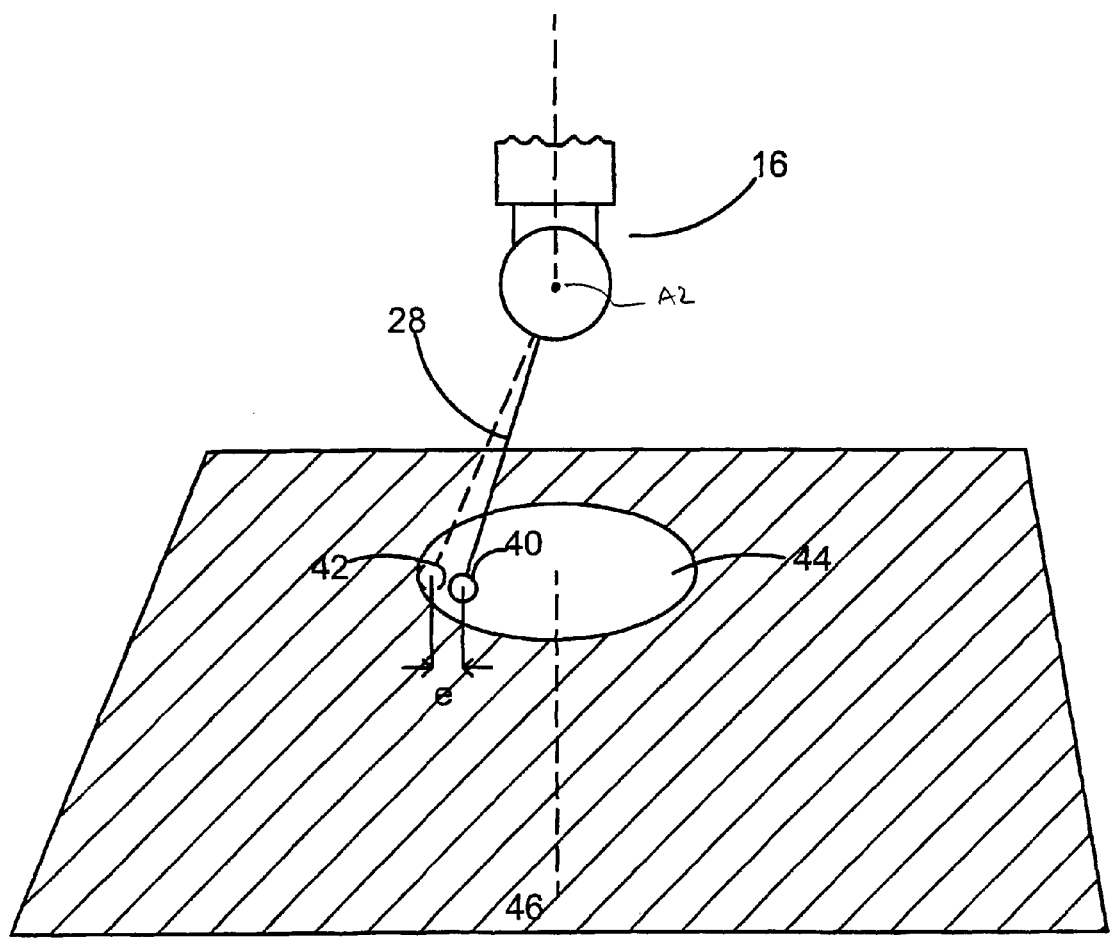
FIG. 4 illustrates a bore being measured using a probe mounted on an articulating probe head.

FIG. 4 illustrates a probe 28 scanning a bore 44. The articulating probe head 16 is centred over the bore 44 with its A1 axis approximately aligned with the central axis 46 of the bore. The probe 28 is rotated about the A2 axis to bring the stylus tip into contact with the internal surface of the bore. In FIG. 4 the actual position of the stylus tip 42 is shown in contact with an internal surface of the bore. The measured position of the stylus tip 40 is also shown. The difference between these two positions is the offset e. The bore is measured by rotating the probe 28 about the A1 axis of the articulating probe head 16. As the angle of the probe about the A2 axis of the articulating probe head remains essentially the same, the offset affects the measurements of the bore in the same way for the whole internal circumference. For the case illustrated in FIG. 4, a radial error causing the bore to appear smaller than its actual size will result.

Figure 5A:
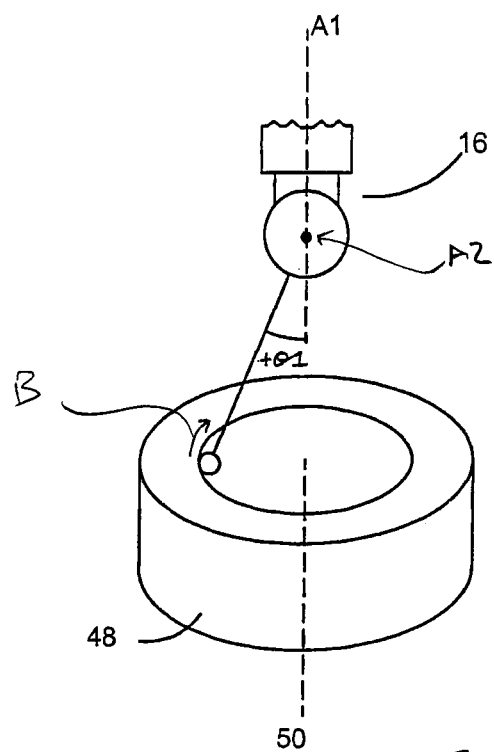
FIGS. 5A and 5B illustrate measurement of a ring gauge according to a first embodiment of the invention.
Figure 5B:
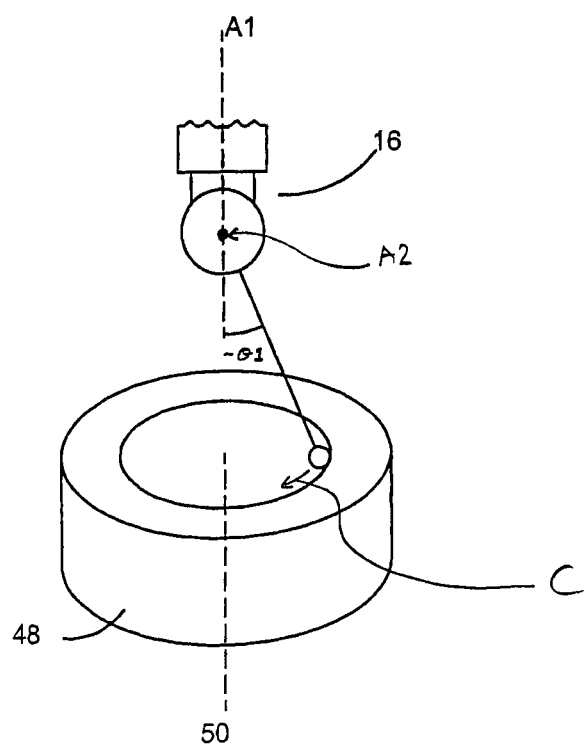

The offset error may be compensated for by the following calibration methods. In a first calibration method, a calibrated ring gauge is used to determine the offset. FIGS. 5A & 5B illustrate a ring gauge 48 for use in the method. With reference to FIG. 5A, the articulating probe head 16 is positioned centrally above the ring gauge 48 with its A1 axis approximately aligned with the central axis 50 of the ring gauge. The probe 28 is rotated through an angle +θ1° about the A2 axis relative to the A1 axis to bring the stylus tip in contact with the internal surface of the ring gauge. If a ring gauge of diameter 100 mm is scanned using a probe having a distance of 250 mm between the intersecting axes in the probe head and the stylus tip and a ring gauge of diameter 100 m, θ1 will have a value of about 12°. FIG. 5A shows the position of the probe 28 at the beginning of the measurement, i.e. its position once it has been rotated about the A2 axis in order to bring it into contact with the internal surface of the ring gauge 48. The internal circumference of the ring gauge 48 is then scanned by rotating the probe 28 about the A1 axis of the articulating probe head 16, for example in the direction illustrated by arrow B. The measurements of the ring gauge will have a radial measurement error, due to the offset of the stylus tip. The measurement error is measured by comparing the difference between the calibrated radius of the ring gauge and the measured radius of the ring gauge. For the offset illustrated in FIG. 3, (i.e. an offset along the −Y direction), the radial error will be negative, resulting in a reduced measured diameter of the ring gauge.

As will be understood, the bigger the angle θ1 the smaller the affect the offset will have on the measurement in the y-dimension. Accordingly, when the method of the invention is used for calibrating the probe, preferably θ1 is kept small, and is preferably no greater than 10° and more preferably no greater than 5°.

The measurement of the ring gauge is repeated, as illustrated in FIG. 5B. Accordingly, the articulating probe head 16 is positioned centrally above the ring gauge 48 with its A1 axis approximately aligned with the central axis 50 of the ring gauge. This time however, in order to bring the stylus tip into contact with the internal surface of the ring gauge the probe 28 is rotated about the A2 axis in an opposite direction that of the first measurement, by a substantially equal amount. Accordingly, the probe 28 is rotated through an angle −θ1° about the A2 axis to bring the stylus tip in contact with the internal surface of the ring gauge 48. FIG. 5B shows the position of the probe 28 at the beginning of the second measurement, i.e. its position once it has been rotated about the A2 axis in the opposite direction in order to bring it into contact with the internal surface of the ring gauge 48. The internal circumference of the ring gauge is again scanned by rotating the probe 28 about the A1 axis of the articulating probe head 16, for example in the direction illustrated by arrow B. The measurements of the ring gauge will have a radial measurement error due to the stylus tip offset. However, this time the radial error is positive, resulting in an increased measured diameter of the ring gauge.

The change in radius measured by these two scans can be used to determine the stylus tip offset. The offset is half the difference between the two measurements. This value of the offset can be used in calibration to correct all subsequent measurements.

As the ring gauge is measured twice using a reversal technique, it is not necessary to calibrate the ring gauge nor the stylus tip diameter. This is because the two measurements can be compared with each other, without needing to compare to the calibrated ring gauge. As both measurements have the same factors, apart from the +ve or −ve angle about the A2 axis, all other errors are cancelled out.

As the stylus tip is rotated about the A1 axis the stylus tip only measures in the Y dimension relative to itself, the Y dimension being fixed relative to and rotating with the stylus tip. Accordingly, this technique shows the offset errors in the Y dimension. There could also be an offset error in the X dimension, however as explained below this will have only a small effect on the measured radius using the above described first measurement method.

The measurement profile of a section of the ring gauge is illustrated in FIG. 6, corresponding to the ring gauge seen from above. The dashed line 54 shows the path followed by the stylus tip and the solid line 56 shows the reported path position, i.e. the path that is actually measured by the probe head. The offset $e_y$ orthogonal to the A2 axis (i.e. in the Y dimension) is shown between paths 54 and 56 is a large component of the radial error.

The offset $e_x$ parallel to the A2 axis (i.e. in the X dimension) is shown by the difference between the actual stylus position 58 and stylus position 60 measured by the probe head 60. This offset produces a second order error in the radial direction but is a very small component of the radial error and has an insignificant effect on the measurement of the object when using the first measurement method.

A second method of compensating for the offset of the stylus tip will now be described with reference to FIGS. 7-8.

Figure 7A:
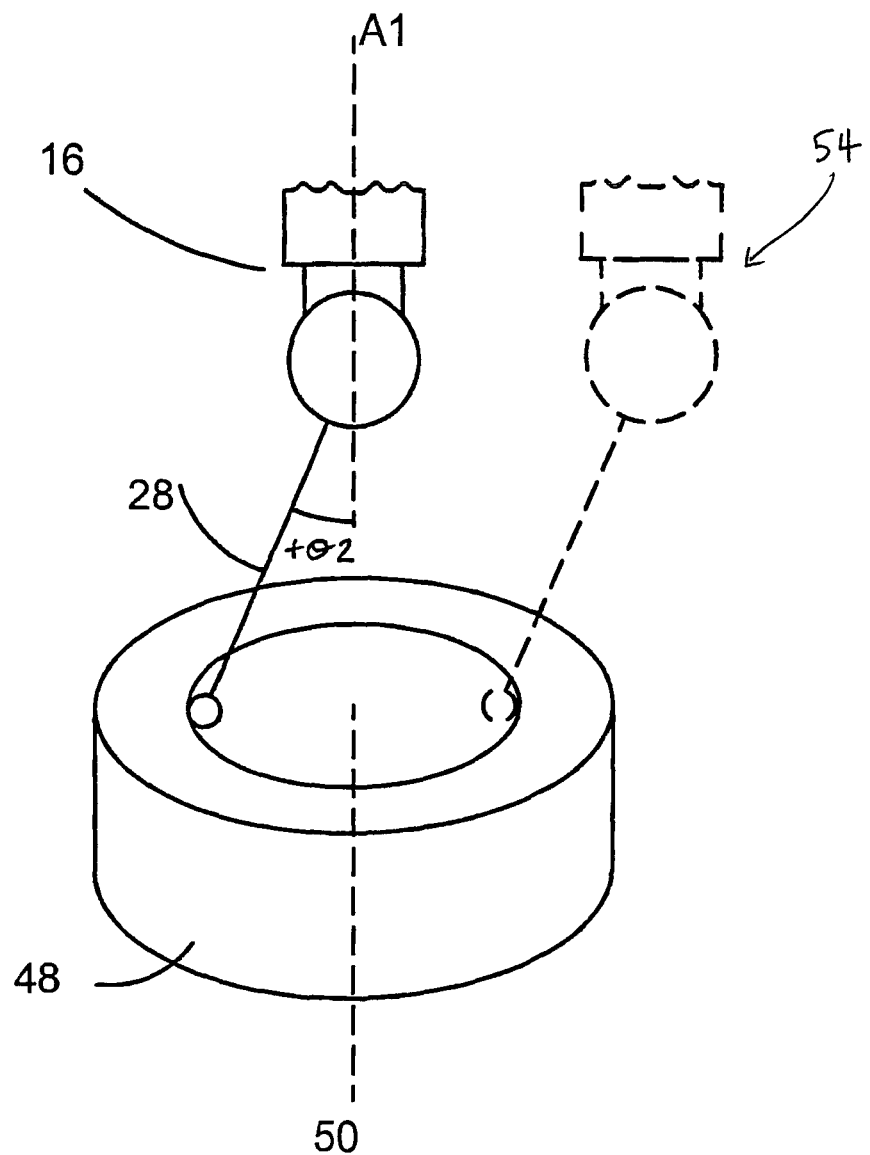
FIGS. 7A and 7B illustrate measurement of a ring gauge according to a second embodiment of the invention.

FIG. 7A illustrates the articulating probe head 16 is positioned above a ring gauge 48. In a first step, the probe is rotated by an angle θ2° about the A2 axis of the articulating probe head. For best results θ2 is zero (i.e. the stylus is parallel to the A1 axis) but could be other angles, for example 5° or 10°. The ring gauge is then measured, keeping the angle of the probe fixed and using motion of the CMM. From these measurements, the centre of the ring gauge is determined. The articulating probe head is shown in another position on the scan in dashed outline 54. It can be seen that the angle θ2° remains the same.

Figure 7B:
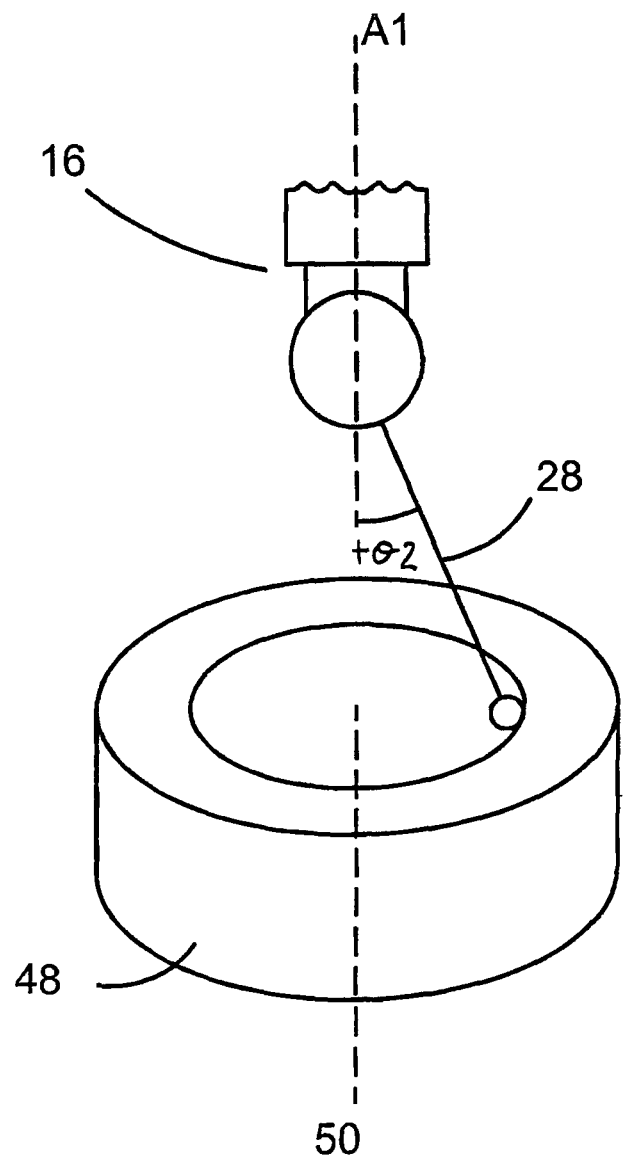

FIG. 7B illustrates a second step, in which the angular orientation of the probe is changed by rotating it by 180° about the A1 axis, whilst keeping the angle about the A2 axis the same. The ring gauge 48 is then measured again, keeping the angle of the probe fixed and using the motion of the CMM. The centre of the ring gauge is again determined as described below.

Figure 8:
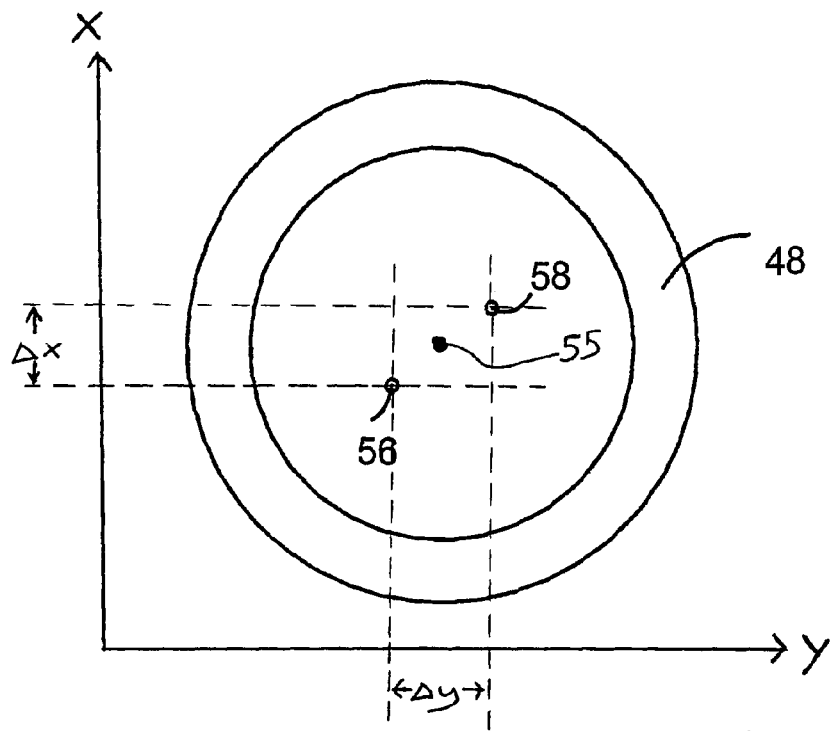
FIG. 8 is a plan view of the ring gauge showing the measured centre determined from the techniques illustrated in FIGS. 7A and 7B.

FIG. 8 is a plan view of the ring gauge 48 with its actual centre position 55 and the first 56 and second 58 measured centre positions from the first and second scans obtained using the method described in connection with FIGS. 7A and 7B. As illustrated, the actual centre position 55 of the ring gauge 48 in the Y dimension is half the difference between the Y positions of the measured centre positions from the first scan 56 and second scan 56, e.g. half Δy, and the actual centre position 55 of the ring gauge 48 in the X dimension is half the difference between the X positions of the measured centre positions from the first scan 56 and second scan 56, e.g. half Δx. Accordingly, the difference between these two measured centre positions 56, 58 enables the offset to be determined, the offset being half the difference. In this embodiment the stylus tip is moved such that it measures in both the X and Y dimensions relative to itself. Accordingly, this technique has the advantage that it enables the offset in both the X and Y directions to be compensated for.

As before, as this is a reversal technique, the ring gauge does not need to be calibrated.

As will be understood, the angle θ2 does not change when using the second measurement method. Accordingly, the second measurement method could be used with embodiments in which the probe is only rotatable about the A1 axis. Accordingly, the probe could be rotatable about only one axis, such as the A1 axis.

As will be understood, the probe need not be rotated by 180° about the A1 axis. For instance, as illustrated in FIGS. 14A and 14B a first measurement 110 (for example of a ring gauge 48) could be taken, the probe could be rotated by 120° about the A1 axis and a second measurement 112 taken, and then the probe could be rotated by a further 120° and a third measurement 113 taken. As shown in FIG. 14A due to the offset the first, second, and third measured positions of the ring gauge 48 are different. In particular, at the first angular orientation the offset affects the measured position of the feature in a first direction 130, the second angular orientation affects the measured position of the feature in a second direction 132 and the third angular orientation affects the measured position of the feature in a third direction 134. As can be seen, the first 130 and second 132 directions are opposing. Furthermore, the first 130 and third 134 directions are opposing. In particular, the second direction 132 can be resolved into first 136 and second 138 orthogonal components in which one of the components, i.e. second component 138 is directly opposite the first direction 130.

Like with the method described in connection with FIG. 8, the three measurements 110, 112, 114 will each have different first 116, second 118 and third 120 centre points which can be used to determine the true centre 122 of the ring. They can also be used to determine the offset in the X and Y dimensions.

As will be understood, the true centre 122 of the ring is the centre of the circle going through the different centre points 116, 118 and 120. The centre of this circle can be determined using, for instance, a least square fitting method. From the centre 122, three (or more) error vectors can be determined: the vector V1 (from 122 to 116) the vector V2 (from 122 to 118) and the vector V3 (from 122 to 120). Those error vectors represent the vector of the sensor offset that has been rotated by the A1 axis. It is the possible to create a system of equation with the three (or more) vectors. If $[R^{A1}{}_{P1}]$ represents the matrix of a rotation about the axis A1 of an angle P1, the system of equation is:

$$[R^{A1}{}_{P1}]*\text{offset}=V1$$

$$[R^{A1}{}_{P2}]*\text{offset}=V2$$

$$[R^{A1}{}_{P3}]*\text{offset}=V3,$$

where P1, P2 and P3 are the A1 axis angular positions when the error vector V1, V2, V3 were measured.

As will be understood, it is possible to solve this system of equations using standard and well known least square minimisation methods, such as Gram-Schmitt orthogonalisation or Householder QR factorisation, in order to identify the co-ordinates of the sensor offset. Accordingly, the offset can be compensated for using the two, three or more measurements.

Although the example of how the method can be performed with more than two measurements describes using an angle of 120°, this is merely illustrative. As will be understood, different angles could be used. Furthermore, as will be understood, the angles between the second and third measurement need not be the same as the angle between the first and second measurement.

Although the above embodiments describe the use of a ring gauge, any circular feature is suitable for this method. Furthermore, the feature need not be circular. For instance the same methods could be applied to touching a point on a plane. For example, a point on an object could be measured with the probe at both the first and second angles (using either the first or second measurement method) and compared in order to compensate for the offset. Furthermore, if using an calibrated object then a first point could be measured with the probe at the first angle and then a second different point could be measured with the probe at the second angle and compared in order to compensate for the offset. For example, a first side of a calibrated cube could be measured with the probe at the first angle and then an opposing second side could be measured with the probe at the second angle. Any offset in the dimension perpendicular to the planes of the opposing sides will affect the measured width of the cube, e.g. by making it appear bigger or smaller than it really is. Accordingly, this can be compared with the known width of the cube in order to determine the offset.

When taking measurements of parts the results of the measurements can be compared to remove errors due to offset. For instance, circular, or helical measurements can be taken using this method, with the results of the two measurements averaged to remove radial errors due to offset.

Optionally, these methods may be used as part of a calibration routine before measurements are taken.

As will be understood, there can be two sources which cause the offset of the stylus tip from its expected position. With reference to FIG. 9, one source of error can be caused by a difference between the expected and actual position of the probe axis (e.g. A2) relative to the head axis (e.g. A1). This can be referred to as the head error and is represented by $y_1$ in FIG. 9. Another source of error can be caused by the difference between the expected and actual angular position of the stylus tip relative to the head axis (e.g. A1). This can be referred to as the probe error and is represented by $y_2$. As can be seen, the actual point of contact 62 between the stylus tip 68 and the surface 66 is different to the measured point of contact 64 due to the $y_1$ and $y_2$ errors. The $y_1$ and $y_2$ values can be calculated from measurements taken using the methods described above.

For instance, when using the method described in connection with FIGS. 5A and 5B (i.e. obtaining first and second measurements by spinning the probe about the A1 axis at respective first and second angles about the A2 axis) then the first 70 and second 72 measurements will be obtained as illustrated in FIG. 10. Due to the $y_1$ and $y_2$ errors, one of the measurements 72 will measure the radius "r" of the feature 74 to be bigger than it actually is by an amount Δr and the other of the measurements 70 will measure the radius "r" of the feature to be smaller than it actually is by an amount Δr. As can be seen from FIG. 9, Δr is equal to the difference between $y_1$ and $y_2$, i.e. $\Delta r=(y_1-y_2)$.

When using the method described in connection with FIGS. 7A and 7B (i.e. obtaining first and second measurements by translationally moving the probe around the feature to be measured at respective first and second angles about the A1 axis) then the third 80 and fourth 82 measurements will be obtained as illustrated in FIG. 11. Using this method the $y_1$ and $y_2$ errors do not affect the measured size of the feature. However, due to the $y_1$ and $y_2$ errors, the lateral positions of the third 80 and fourth 82 measurements will be affected. In particular, the measured centre point 84 of the fourth 82 measurement will be displaced laterally relative to the actual centre point 88 of the feature 74 in a first direction and the measured centre point 86 of the third 80 measurement will be displaced laterally relative to the actual centre point 88 of the feature in a second direction opposite to the first direction. The difference between the third 86 and fourth 84 centre points in the y dimension is referred to the Δy error and is equal to twice the sum of $y_1$ and $y_2$ i.e. $\Delta y=2(y_1+y_2)$.

Accordingly, Δr and Δy can be determined from inspecting the measurements obtained. Subsequently, as Δr and Δy are known, $y_1$ and $y_2$ can be calculated by combining the position and radius variation values, e.g. by using the following equations:

$$y_1=(\Delta r+\Delta y/2)/2$$

$$y_2=(\Delta r-\Delta y/2)/2$$

Figure 12:
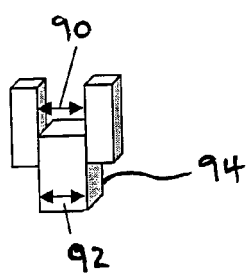
FIG. 12 illustrates a gauge block suitable for use with the method of the invention.
Figure 13:
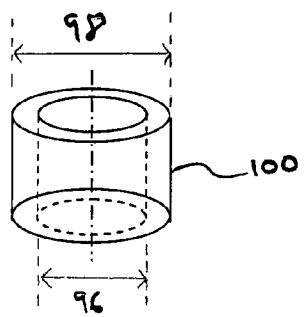
FIG. 13 illustrates a gauge ring suitable for use with the method of the present invention.

Although the above embodiments describe scanning a circular feature, these methods are also suitable for taking discrete measurement points, as the same radial errors are produced by the offset. For example, with reference to FIG. 12, the inside length 90 and/or the outside length 92 of a gauge block 94 can be measured. Likewise, with reference to FIG. 13, the inner 96 and/or the outer 98 diameter can be measured of a ring gauge 102.

The methods described above involve measuring surfaces that are substantially parallel to the A1 axis, and in particular involve measuring circular features having a central axis that is substantially parallel to the A1 axis. However, as will be understood, this need not be the case and could be used in measuring surfaces that are not parallel to the A1 axis. For instance, the invention could be applied to measuring surfaces that extend perpendicular to the A1 axis. For example, the invention could be used during measurement of a bore or circular feature having a central axis that extends perpendicular to the A1 axis. In this case as will be understood, the surface sensor will need to be rotated about the A1 and A2 axes between the first and second measurements in order for any surface sensor offset to have an opposing effect on the first and second measurements. For example with reference to FIGS. 1 and 2, if the first measurement is obtained with the surface sensor 30 positioned at first angular orientation in which it is at a 90° angle about the A2 axis relative to the A1 axis (such that the stylus 29 is positioned substantially horizontally—as shown in FIG. 1), then the second angular orientation could be achieved by for instance rotating the surface sensor by 180° about the A1 axis and by 180° about the A2 axis (in either order). In this case the effect of the offset on the second measurement will be equal and opposite its effect on the first measurement.

Further, the method could be implemented by measuring only a single point on an object two or more times, with the probe at different angular orientations for each of the plurality of measurements. For instance, a single point on a ring gauge 48, gauge block 94 or other feature could be measured with the measurement probe at a first angular orientation and then subsequently measured at least a second time with the measurement probe at a second angular orientation. The first and at least second measurements can then be compared to identify the offset of the surface sensor. For example, with reference to the above described embodiments the first measurement of a single point could be obtained with the probe at a first angular orientation about the A1 axis. The probe could then be rotated by 180° about the A1 axis and then a second measurement of the same point could be obtained. In this case the effect of any offset of the surface sensor in the measured dimension on the measured position of the single point with have a directly opposite effect. Accordingly, the offset can be determined as being half the difference of the first and second measured positions. The single point could be a point on a plane. The single point could be for instance the corner of a feature, such as a corner of a cube.

Furthermore, although the above embodiments describe using a contact probe, these methods are also suitable for non-contact probes, such as optical, capacitance or inductance probes.

Further still, as will be understood, the method is not limited to use with vertical arm coordinate positioning machines. For example, it is also suitable for use with horizontal arm coordinate positioning machines.

In the described embodiments the articulating probe head is mounted on a mounting structure equivalent to the quill of a CMM. This invention is also suitable for use with a surface sensor mounted on other machine types. For example, the articulating probe head may be mounted onto the distal end of an inspection robot, which may for example comprise a robotic arm having several articulating joints.

The invention claimed is:

1. A method of operating a coordinate positioning apparatus having an articulated head on which a surface sensor is mounted, the articulated head providing for rotation of the surface sensor about at least first and second axes, the method comprising:

positioning the surface sensor at a first angular orientation about the articulated head's first axis and obtaining a first measurement of an artifact with the surface sensor at the first angular orientation which comprises actuating the articulated head to rotate the surface sensor about the articulated head's second axis;

driving the articulated head to position the surface sensor at a second angular orientation about the first axis and obtaining at least a second measurement of the artifact with the surface sensor at the second angular orientation which comprises actuating the articulated head to rotate the surface sensor about the articulated head's second axis, the first and second angular orientations being different from each other such that any offset of the surface sensor from an expected position will have at least a partially opposing effect on the first and second measurements; and using the first and second measurements to establish the offset of the surface sensor from the expected position, and using the offset to correct errors in subsequent measurements obtained by the surface sensor.

2. A method as claimed in claim 1, in which the second angular orientation is different to the first angular orientation such that the effect on the second measurement of any offset of the surface sensor from the expected position is substantially equal and opposite to the effect on the first measurement.

3. A method as claimed in claim 2 in which the second angular orientation is substantially inverse the first angular orientation.

4. A method as claimed in claim 1, in which obtaining the first and second measurements comprise moving the surface sensor such that the surface sensor measures in a first dimension only relative to the surface sensor.

5. A method as claimed in claim 1, in which obtaining the first and second measurements comprise moving the surface sensor relative to an artifact such that the surface sensor measures in first and second dimensions relative to the surface sensor.

6. A method as claimed in claim 1 in which establishing the offset comprises determining the offset of the surface sensor in at least a first dimension.

7. A method as claimed in claim 6 in which establishing the offset comprises determining the offset of the surface sensor in at least a second dimension.

8. A method as claimed in claim 6, comprising determining at least first and second offset sources.

9. A method as claimed in claim 8, in which the first offset source comprises the difference between the actual and expected position of the at least first axis and the second offset source comprises the difference between the actual and expected position of the surface sensor relative to the first axis.

10. A method as claimed in claim 1 in which establishing the offset comprises determining a resultant measurement from the first and second measurements.

11. A method as claimed in claim 1 in which the second measurement is a repeat of the first measurement with the surface sensor at a different angular orientation.

12. A method as claimed in claim 1 in which obtaining each of the first and second measurements comprises measuring a plurality of points of an artifact.

13. A method as claimed in claim 1 in which obtaining the first and second measurements comprise obtaining first and second measurements of a circular feature.

14. A method as claimed in claim 1 in which the surface sensor is rotatable about at least a second axis that is perpendicular to the first axis.

15. A method as claimed in claim 14, in which the first and second angular orientations are taken about the first axis and measured relative to the second axis.

16. A method as claimed in claim 14, in which obtaining the first and second measurements comprises maintaining a linear position of the second axis.

17. A method as claimed in claim 14 in which second angular orientation is substantially equal and opposite the first angular orientation.

18. A method as claimed in claim 1 in which the surface sensor is a contact tip of a contact probe.

19. A coordinate positioning apparatus having an articulated head on which a surface sensor is mounted, the articulated head providing for rotation of the surface sensor about at least first and second axes, and a controller which is configured to perform a method comprising:
    positioning the surface sensor at a first angular orientation about the articulated head's first axis and obtaining a first measurement of an artifact with the surface sensor at the first angular orientation which comprises actuating the articulated head to rotate the surface sensor about the articulated head's second axis;
    driving the articulated head to position the surface sensor at a second angular orientation about the first axis and obtaining at least a second measurement of the artifact with the surface sensor at the second angular orientation which comprises actuating the articulated head to rotate the surface sensor about the articulated head's second axis, the first and second angular orientations being different from each other such that any offset of the surface sensor from an expected position will have at least a partially opposing effect on the first and second measurements; and
    using the first and second measurements to establish the offset of the surface sensor from the expected position, and using the offset to correct errors in subsequent measurements obtained by the surface sensor.

20. A computer readable storage medium storing computer-executable program code, the program code including instructions which when executed by a controller of a measurement system having an articulated head on which a surface sensor is mounted, the articulated head providing for rotation of the surface sensor about at least first and second axes, cause the measurement system to perform steps comprising:
    positioning the surface sensor at a first angular orientation about the articulated head's first axis and obtaining a first measurement of an artifact with the surface sensor at the first angular orientation which comprises actuating the articulated head to rotate the surface sensor about the articulated head's second axis;
    driving the articulated head to position the surface sensor at a second angular orientation about the first axis and obtaining at least a second measurement of the artifact with the surface sensor at the second angular orientation which comprises actuating the articulated head to rotate the surface sensor about the articulated head's second axis, the first and second angular orientations being different to from each other such that any offset of the surface sensor from an expected position will have at least a partially opposing effect on the first and second measurements; and
    using the first and second measurements to establish the offset of the surface sensor from the expected position, and using the offset to correct errors in subsequent measurements obtained by the surface sensor.

21. A method as claimed in claim 1, in which obtaining the first and second measurements comprise measuring the position of substantially the same point on the artifact.

22. A method as claimed in claim 1, in which obtaining the first and second measurements comprise measuring the position of a single point on the artifact.

23. A method as claimed in claim 1, in which obtaining the second measurement of the artifact comprises rotating the surface sensor about the articulated head's second axis in a direction opposite to that which the surface sensor is rotated to obtain the first measurement.

* * * * *